Aug. 22, 1961  W. R. GARNER ET AL  2,997,662
NOISE FREQUENCY-MODULATED PULSE GENERATOR
Filed July 9, 1947  2 Sheets-Sheet 2

INVENTORS
Wendell R. Garner
Stanley Smith Stevens
By Harry M. Saragovitz
ATTORNEY

United States Patent Office 2,997,662
Patented Aug. 22, 1961

2,997,662
NOISE FREQUENCY-MODULATED PULSE GENERATOR
Wendell R. Garner and Stanley Smith Stevens, Cambridge, Mass., assignors to the United States of America as represented by the Secretary of War
Filed July 9, 1947, Ser. No. 759,850
6 Claims. (Cl. 331—78)

The invention described herein may be manufactured and used by or for the Government for governmental purposes, without the payment to us of any royalty thereon.

This invention relates to radar and the formation of radar pulses. More particularly, the invention is concerned with a method and apparatus for modifying radar pulses.

It has been customary to operate search radars which are pulsed at fixed and distinct rates. When such pulses are received at a radar search receiver, as they may be when an enemy finds out that it is being subjected to radar, they are modified and converted to auditory signals which enable the enemy to identify and "home" on the search radar.

An object of the invention is to deal with this problem and to improve radar operations with a view to modifying the pulse repetition frequencies of various radars in order to disguise them. Other objects will appear from the following description.

As one means of accomplishing the objective referred to we have devised an improved method of radar operation which comprises "randomizing" the pulse repetition frequencies of various radars.

Figure 1:
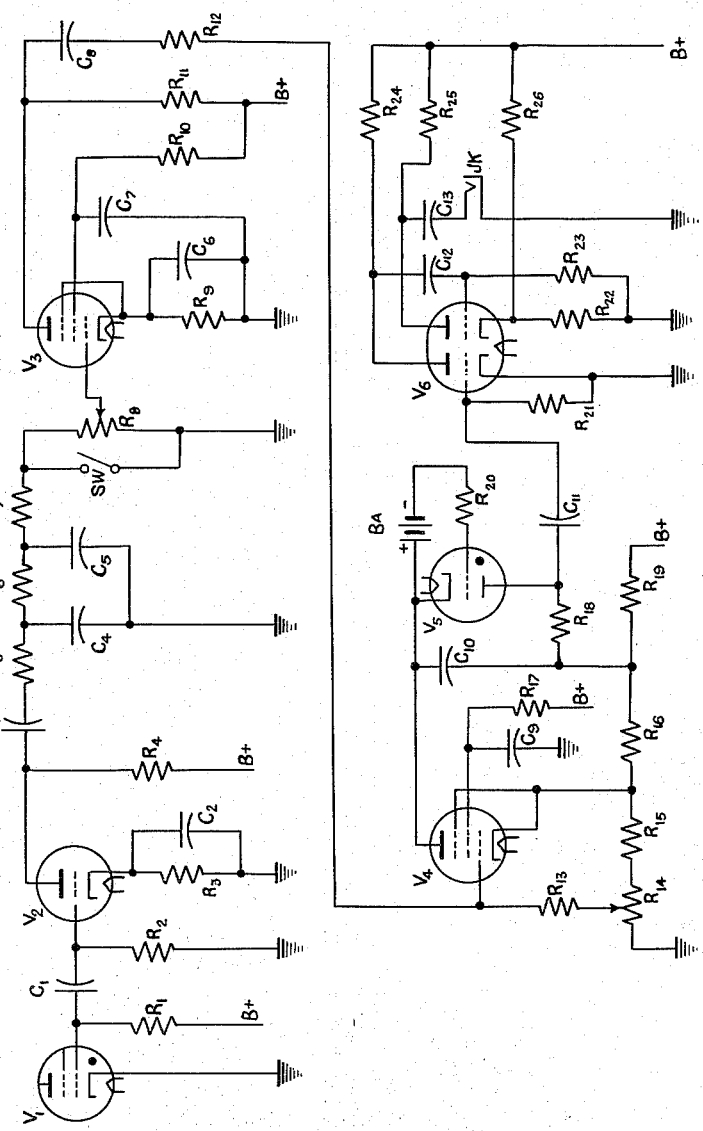
Figure 2:
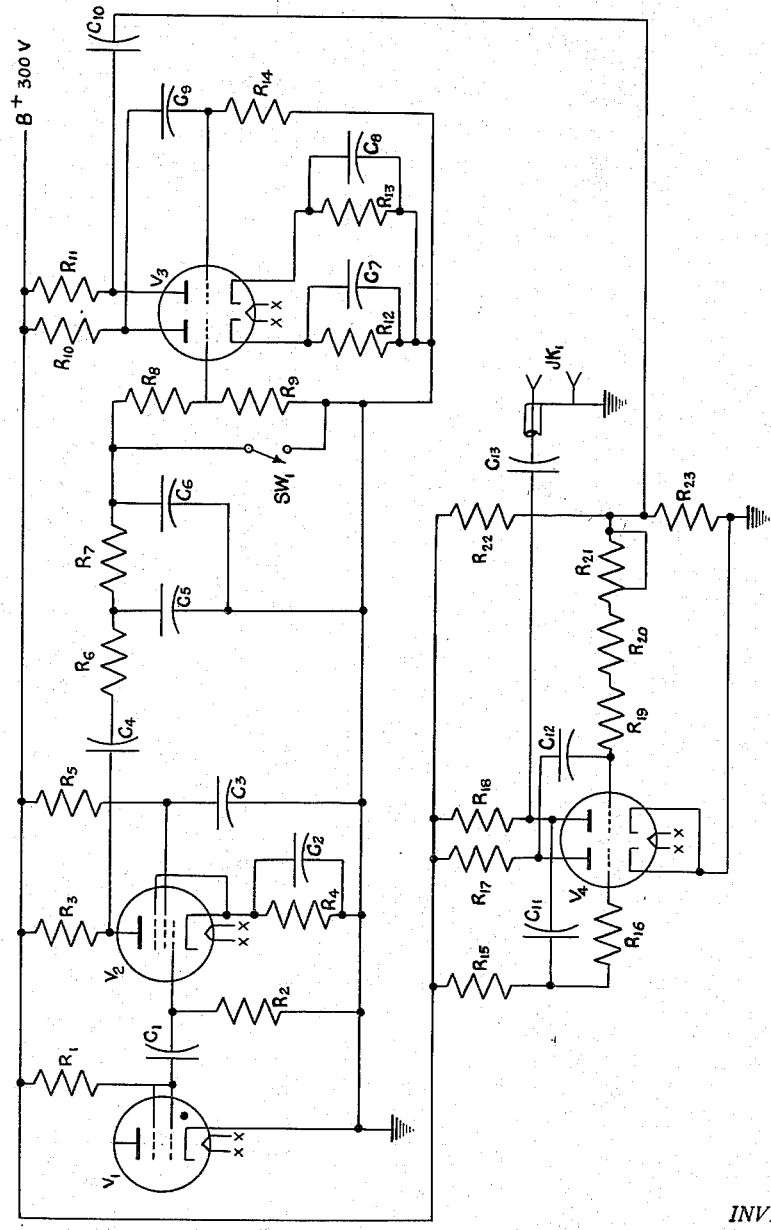

In the accompanying drawings:

FIGURE 1 is a schematic diagram illustrating circuit means of the invention; and FIGURE 2 is a schematic diagram illustrating a modification of circuit means.

These circuits illustrate methods of reducing the audibility of the search radar heard for example by an enemy. The methods are based on the fact that the audibility of a train of pulses may be reduced since the quality is made more like that of noise when the pulses are spaced at irregular intervals instead of at regular intervals. If the pulses are thought of as having a repetition frequency which varies irregularly in such a way as to produce this irregular spacing, the randomization proposed may be thought of as a randomization of the radar pulse repetition frequencies.

One means of providing a randomized pulse to trigger a radar is to employ a pulse repetition frequency-modulating circuit and to use a random noise as the modulating signal. This provides a pulse rate which is randomized but controllable. When the pulse rate is modulated by noise, the rate as measured within any short time interval is related to the noise voltage during the interval, and the rate of change of pulse repetition frequency is determined by the frequency spectrum of the random noise. Thus it is possible to predetermine the longest and the shortest intervals between pulses, and the control thus achieved is continuously variable. If, at any time, the modulating noise voltage is doubled, then the maximum time interval between pulses is doubled and the minimum time interval is halved. This relation holds exactly, of course, only if the pulse rate is linearly related to the noise voltage.

Similarly, the rate of change of pulse repetition frequency is controlled by adjusting the spectrum of the modulating noise. If high frequencies predominate in the spectrum of the modulating voltage, the pulse rate changes rapidly; if low frequencies predominate, the pulse rate changes slowly. Here "high" and "low" are to be interpreted as relative to the pulse rate of the radar prior to randomization (or to the long-time average pulse rate of the randomized pulses).

Two methods of providing a randomly modulated pulse repetition frequency are here proposed. Each of these involves essentially the same major components; a random noise generator, filters, noise amplifiers, and a pulse rate modulated pulse generator.

One method has been illustrated schematically in FIG. 1. In this circuit, $V_1$ is the basic noise generator. $V_1$ is a tetrode thyratron, in which the plate and suppressor grid are not used. Current flows through the tube from the first grid to the cathode, and the varying impedance creates a random voltage at the grid. This random voltage is amplified by $V_2$, an amplifier of standard design. $R_5$, $R_6$, $C_4$ and $C_5$ constitute a low-pass filter. The function of this filter is to limit the frequencies of the noise, which is desirable because frequencies higher than half the frequency of the modulated pulse frequency do not effectively modulate the pulse frequency. Thus the values of these components will vary according to the pulse rate of the radar prior to randomization.

$V_3$ is another amplifier of standard design, and is constructed so as to allow control of the noise voltage by means of $R_8$. The switch across $R_8$ permits the noise voltage to be shorted out, returning the pulse generator to a steady pulse rate.

$V_5$ is a gas-discharge tube connected with $V_4$ as a relaxation oscillator. The bias on the control grid of the pentode $V_4$ is determined by the potentiometer $R_{14}$, and this bias determines the rate at which current will flow through the tube from B plus to ground. By this means it also determines the rate at which the voltage across $C_{10}$ will build up. The voltage at the plate of $V_5$ actually does not change, but rather the voltage at the cathode becomes more and more negative and current flows through $C_{10}$ and the pentode. When the potential between the plate and the cathode has reached a certain point, the tube discharges. Current never flows through $R_{18}$ except when this discharge occurs, and this fact is utilized in generating a pulse. The duration of the pulses thus generated is determined by the value of $C_{10}$ and $R_{18}$.

When the bias on the control grid of $V_4$ is varied randomly, the rate at which current flows through the tube is varied randomly in turn. And again in turn, the rate at which the gas tube will discharge the condenser $C_{10}$ varies randomly. By this means, pulse randomization is achieved.

The two triode sections of $V_6$ are used to shape the pulses and limit their amplitudes, and the output pulses appear between $C_{13}$ and ground. These random pulses are used to trigger the timing oscillator of a radar.

It is pointed out that the combination of components described provides a means of generating trigger pulses the pulse rate of which is "random" within certain controllable limits. This is an important factor in the practical operation of randomizing devices.

FIGURE 2 illustrates a second method including a circuit which provides pulses of randomly modulated pulse rate. $V_1$ is a noise generator whose operation is identical to that of $V_1$ in FIG. 1. $V_2$ and $V_3$ are likewise amplifiers of standard design, whose function is to amplify the noise voltage. The shorting switch around $R_8$ and $R_9$ allows the pulse generator to be operated at a steady pulse rate. $R_6$, $R_7$, $C_5$ and $C_6$ comprise a low-pass filter, the function of which is identical with that of the filter described in the first method. The values of the resistances and capacitances are determined by the pulse rate prior to randomization.

$V_4$ is a multivibrator of the free running type, the pulse repetition frequency (frequency of vibration) of which is determined—when $C_{10}$ is removed—by $C_{11}$, $C_{12}$, $R_{15}$, $R_{16}$, $R_{19}$, $R_{20}$, $R_{21}$, $R_{22}$, and $R_{23}$. The positive biases applied to the grids (as determined for the one grid by $R_{15}$, and for the other grid by $R_{22}$ and $R_{23}$) are important factors in this determination. Each bias serves to control the length of the time interval during which the plate current of the associated triode is cut off.

If the interval during which the right-hand triode is cut off is large compared to the interval during which the left-hand triode is cut off, then the pulse rate of the multivibrator can be controlled by controlling the off period of but one of the triodes. By this means, it is possible to modulate the pulse rate by superimposing a variable voltage upon the direct current bias of the one grid, i.e., between $R_{22}$ and $R_{23}$. Random noise is used as the variable voltage in order, of course, to make the modulation of the pulse rate random.

Thus the entire circuit produces a randomly modulated pulse repetition frequency, and the amplitude, duration, and shape of the pulses are independent of the pulse rate. This circuit allows, as does the circuit of the first method, full control over the maximum and minimum intervals between pulses and over the rate of change of the pulse repetition frequency.

It is intended that the invention may be practiced in modified forms within the scope of the appended claims.

We claim:

1. A system for random variation of the pulse repetition rate of a pulse-echo device for object location to avoid enemy identification of the pulse-echo signal, comprising in combination a random noise generator, an amplifier, a low pass filter, and a second amplifier connected in series, a relaxation oscillator for generating pulses, including a resistor, a gas tube and a pentode tube connected in series in the aforesaid order across a source of direct current potential one end of said resistor being positive, said gas tube having an anode connected to the other end of said resistor, a cathode connected to the anode of said pentode, and a grid, a source of negative bias potential for the grid, and a capacitor bridging from the gas tube cathode to the positive terminal of the potential source, said pentode tube having a cathode connected to a negative point in said potential source and having a control grid biased beyond cut-off and connected to the output of said second amplifier whereby random noise pulses less than a predetermined value are rejected, and an output amplifier having input and output circuits adapted to limit and shape the pulse output, said input circuit being capacitively coupled to said gas tube anode.

2. In a pulse-echo device for object location, means for random modulation of the pulse repetition rate comprising a random noise generator, a pulse generator, a rate control element for said pulse generator, and a connection from the noise generator output to said rate control element for random variation of the pulse repetition rate; said pulse generator including a gas discharge tube having an anode, a cathode and a negatively biased grid, an anode resistor connected to a source of positive potential, a condenser connected from the cathode to the positive end of the resistor, and an anode output connection; said rate control element including a pentode tube having an anode connected to the cathode of said gas tube, a cathode connected to a source of negative potential, and a control grid biased negatively beyond cut-off; whereby noise pulses less than a predetermined minimum are rejected and only such pulses as exceed said minimum and have sufficient duration to charge said condenser to the breakdown potential of the gas tube produce sharp output pulses.

3. In a pulse-echo device for object location, means for random variation of the pulse repetition rate comprising, a random noise generator, a pulse generator, and a pulse rate modulator, said random noise generator including a gas discharge tube having an anode, a cathode and at least one grid, said pulse generator including a gas discharge tube having an anode, an anode output connection, a cathode and a negatively biased grid, a resistor connecting the anode to a source of positive potential, and a condenser bridged from the cathode to the positive end of said resistor; said pulse rate modulator including a vacuum tube having an anode connected to the cathode of said gas tube, a cathode connected to a source of negative potential, and a control grid biased beyond cut-off, whereby noise pulses less than a predetermined minimum are rejected and only pulses exceeding said minimum and having sufficient duration to charge said condenser to the firing potential of the gas tube produce sharp output pulses across said gas tube anode resistor.

4. A random modulated pulse-echo device as defined in claim 3 including a noise amplifier and a low pass filter each having input and output terminals respectively; a connection from the output terminals of said random noise generator to the input of said amplifier, a connection from the amplifier output to the input of said low-pass filter, and a connection from the low-pass filter output to the control grid of said pulse rate modulator, whereby random noise frequencies transmitted to said pulse generator exceeding the cut-off frequency of the low-pass filter are rejected.

5. In a pulse-echo device for object location means for producing random variation of the pulse repetition rate comprising, a random noise generator, a pulse generator, a pulse rate modulator, and a source of direct current potential, said random noise generator including a gas tube having a cathode, a control grid, and a grid resistor; a connection from said resistor to a positive point in said potential source, and a connection from said cathode to a point of negative potential, said pulse generator including a gas tube having an anode connected to a positive point in said potential source through a resistor, a cathode, an output connection connected to said anode, a grid biased negatively, and a condenser connected from said cathode to said positive potential point; said pulse rate modulator including a vacuum tube having an anode connected to the cathode of said gas tube, a cathode connected to a point of negative potential, and a control grid biased beyond cut-off connected to the grid of said noise generator; whereby, said noise generator pulses having amplitude less than a predetermined value are excluded and only pulses exceeding said predetermined value and having sufficient duration to charge said condenser to the break-down potential of said pulse generator produce sharp random output pulses on said output connection.

6. A random pulse rate modulating device as defined in claim 5 including a noise amplifier and a low pass filter each having input and output terminals respectively; a connection from the output grid of said noise generator to the amplifier input, a connection from the amplifier output to the low-pass filter input, and a connection from the low-pass filter output to the control grid of said pulse rate modulator, whereby the band of random noise frequencies transmitted to said pulse generator is limited by the cut-off frequency of the low-pass filter.

References Cited in the file of this patent

UNITED STATES PATENTS

| | | |
|---|---|---|
| 2,253,975 | Guanella | Aug. 26, 1941 |
| 2,266,516 | Russell | Dec. 16, 1941 |
| 2,416,307 | Grieg | Feb. 25, 1947 |
| 2,420,303 | De France | May 13, 1947 |
| 2,428,926 | Bliss | Oct. 14, 1947 |
| 2,448,069 | Ames et al. | Aug. 31, 1948 |